US009508002B2

(12) United States Patent
Barcay

(10) Patent No.: US 9,508,002 B2
(45) Date of Patent: Nov. 29, 2016

(54) GENERATING CINEMATIC FLYBY SEQUENCES FOLLOWING PATHS AND GPS TRACKS

(75) Inventor: Daniel Barcay, San Francisco, CA (US)

(73) Assignee: Google Inc., Mountain View, CA (US)

( * ) Notice: Subject to any disclaimer, the term of this patent is extended or adjusted under 35 U.S.C. 154(b) by 909 days.

(21) Appl. No.: 13/482,889

(22) Filed: May 29, 2012

(65) Prior Publication Data

US 2015/0170403 A1    Jun. 18, 2015

Related U.S. Application Data

(60) Provisional application No. 61/497,004, filed on Jun. 14, 2011.

(51) Int. Cl.
G06T 13/20       (2011.01)
G06T 15/20       (2011.01)
G06K 9/00        (2006.01)
G06T 17/05       (2011.01)
G06T 19/00       (2011.01)

(52) U.S. Cl.
CPC ........... *G06K 9/00476* (2013.01); *G06T 17/05* (2013.01); *G06T 19/003* (2013.01)

(58) Field of Classification Search
USPC ................................................ 345/419, 427
See application file for complete search history.

(56) References Cited

U.S. PATENT DOCUMENTS

| 5,003,306 | A | * | 3/1991 | Takahashi | G01C 21/30 340/990 |
| 5,669,821 | A | * | 9/1997 | Prather | A63G 31/16 104/78 |
| 8,847,992 | B2 | * | 9/2014 | Kornmann | G06F 1/1626 345/158 |
| 2003/0107647 | A1 | * | 6/2003 | James | A63F 13/10 348/116 |
| 2004/0189691 | A1 | * | 9/2004 | Jojic | G06F 17/30825 715/720 |
| 2007/0132779 | A1 | * | 6/2007 | Gilbert et al. | 345/619 |
| 2009/0259976 | A1 | * | 10/2009 | Varadhan | G06T 15/20 715/850 |
| 2013/0018992 | A1 | * | 1/2013 | Asher | G06F 17/30551 709/219 |
| 2014/0172291 | A1 | * | 6/2014 | Lookingbill | G01C 21/00 701/409 |

OTHER PUBLICATIONS

Christie et al., "Camera Control in Computer Graphics", Computer Graphics Forum, vol. 27, No. 8, Dec. 2008, pp. 2197-2218.

* cited by examiner

*Primary Examiner* — Kimbinh Nguyen
(74) *Attorney, Agent, or Firm* — Dority & Manning, P.A.

(57) ABSTRACT

A visualization system and method allow moving objects to be visualized in a GIS system as an interactive animation by moving an icon or 3D graphical model in an interactive virtual environment of the GIS. A line may also be drawn behind the icon/3D model representing the path traveled during a window of time. Additionally, the evolution of time-dependent data associated with the moving object may be encoded and visualized in the GIS.

25 Claims, 10 Drawing Sheets

500

```
<Placemark>
    <name>My first track</name>
    <styleUrl>#mytrackstyle</styleUrl>
    <gx:Track>
    <altitudeMode>absolute</altitudeMode>
    <when>2010-04-07T23:30:55Z</when>
    <when>2010-04-07T23:31:13Z</when>
    <when>2010-04-07T23:31:32Z</when>
    <when>2010-04-07T23:31:52Z</when>
    <when>2010-04-07T23:32:11Z</when>
    ...
    <gx:coord>-83.671639 1.675732 7.827881000000001</gx:coord>
    <gx:coord>-83.67233299999999 1.675678 4.943848000000001</gx:coord>
    <gx:coord>-83.672904 1.67574 3.982666</gx:coord>
    <gx:coord>-83.67346499999999 1.675781 4.463257</gx:coord>
    <gx:coord>-83.67400600000001 1.675855 3.501953</gx:coord>
     ...
    <Model id="model_2">
      ...
     <Link>
      <href>/Users/mmarks/Documents/track.kmz/files/mymodel.dae</href>
     </Link>
    </Model>
    </gx:Track>
</Placemark>
```

FIG. 5

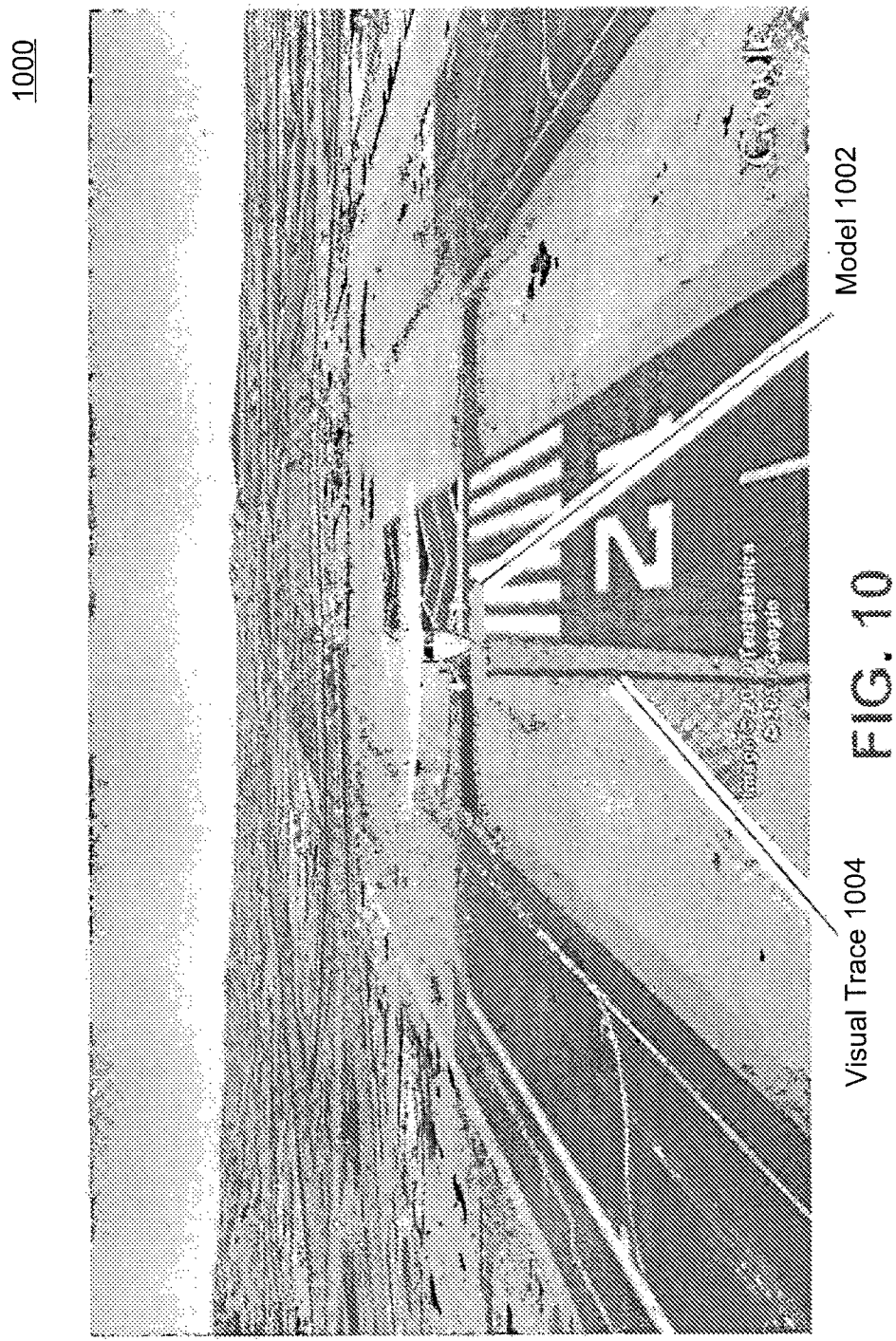

GENERATING CINEMATIC FLYBY SEQUENCES FOLLOWING PATHS AND GPS TRACKS

CROSS REFERENCE TO RELATED APPLICATIONS

This patent application claims the benefit of U.S. Provisional Patent Application No. 61/497,004, filed Jun. 14, 2011, entitled "Generating Cinematic Flyby Sequences Following Paths and GPS Tracks," which is incorporated herein by reference in its entirety.

BACKGROUND

1. Field

Embodiments of the present invention relate generally to navigating in a geographic information system (GIS).

2. Background

A geographic information system (GIS) is a system for archiving, retrieving, displaying or manipulating data indexed according to the data elements' respective geographic coordinates. The data elements may be a variety of data types such as, for example, satellite imagery, maps, models of buildings and terrain, and other geographic features. Further, data elements may include representations of real-world objects at various geographic locations. For example, geographic coordinates of the object may be tracked over time using a global positioning system (GPS) receiver or device.

As GPS devices have become ubiquitous (e.g., most mobile phones today have integrated GPS receivers), such devices can optionally be used to record location-based information corresponding to an object and it's movement over time. However, conventional GIS systems are often limited in their ability to effectively utilize GPS data to present meaningful information about the location or movement of objects over time. Conventional GIS systems display only static representations of such content, for example, by displaying lines or a collection of points represent the changing positions of an object.

BRIEF SUMMARY

A capability for generating cinematic fly-by sequences following paths and GPS tracks is provided. In an embodiment, a computer-implemented method provides an animated visualization of geo-located objects in a geographic information system. The method includes: (1) determining a first position of a first moving object to be visualized at a first time in an interactive three-dimensional environment of the geographic information system based on geographic positioning data associated with the first moving object over a period of time; (2) positioning a graphical representation of the first moving object at the first time in the interactive three-dimensional environment according to the determined first position; (3) determining a second position of the first moving object to be visualized at a second time in the interactive three-dimensional environment based on the geographic positioning data associated with the first moving object; (4) defining a first path of a virtual camera in the interactive three-dimensional environment based on the determined first and second positions of the first moving object at the respective first and second times, the first moving object to be visualized in the interactive three-dimensional environment from a perspective of the virtual camera; (5) automatically generating in real-time an animation of the graphical representation of the first moving object in the interactive three-dimensional environment based on the defined first path of the virtual camera so as to visualize a smooth transition of the first moving object from the first position at the first time to the second position at the second time in the interactive three-dimensional environment; and (6) dynamically rendering the generated animation and views of geographic information within the interactive three-dimensional environment on a display from the perspective of the virtual camera moving along the first path from the first position to the second position. The determining the first and second positions, the positioning, the defining, the generating, and the rendering are performed by one or more computing devices implementing the interactive three-dimensional environment of the geographic information system.

System and computer program product embodiments are also disclosed.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

FIG. 5 is an exemplary portion of an encoding language for animated visualization of geo-located objects in a GIS, according to an embodiment.

FIG. 10 illustrates an exemplary screenshot of a cinematic tour of visualized GPS data in a geographic environment, according to an embodiment.

DETAILED DESCRIPTION

Figure 1:
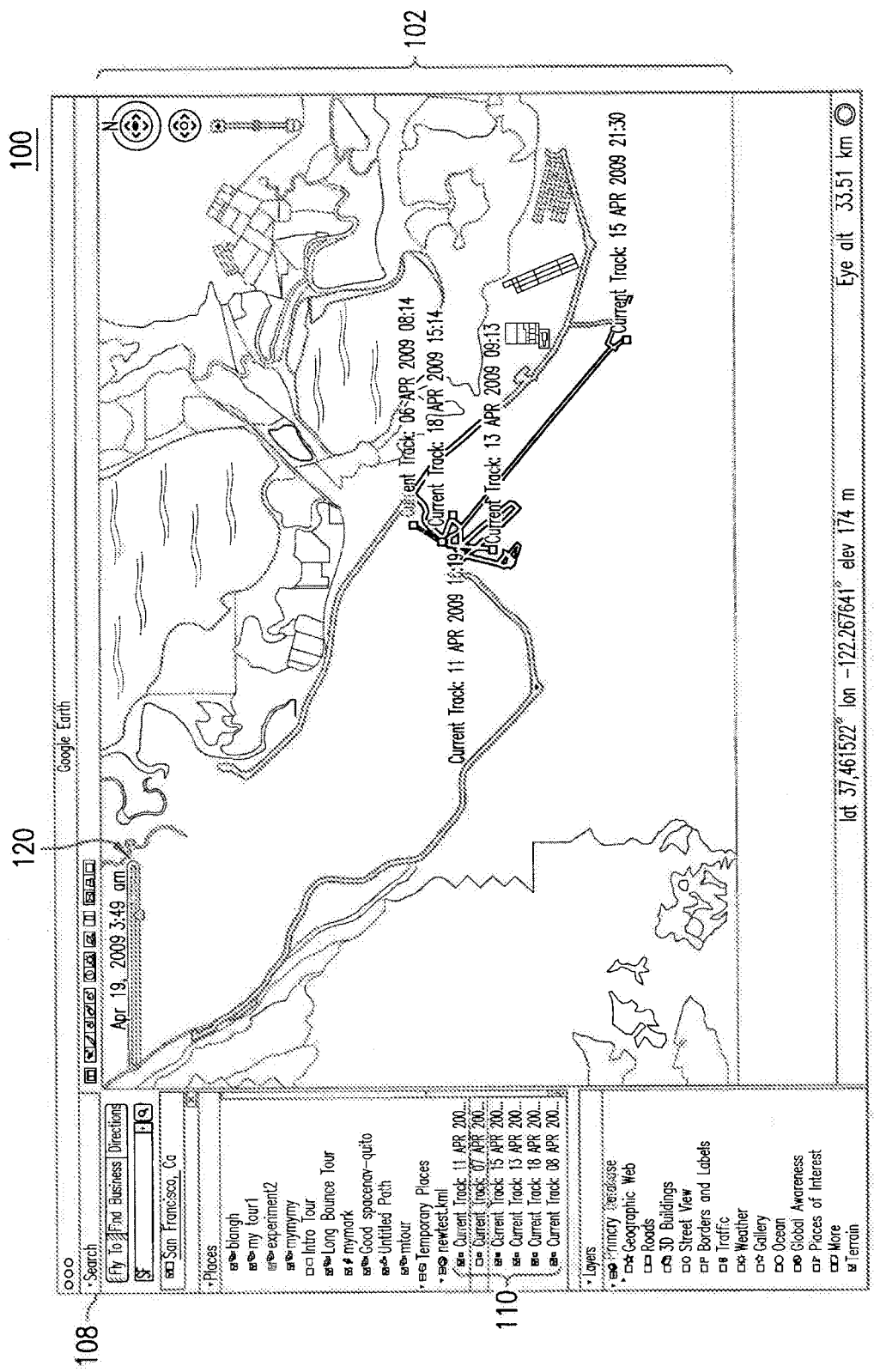
FIG. 1 illustrates an exemplary graphical user interface for a geospatial browser of a GIS, according to an embodiment.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to affect such feature, structure, or characteristic in connection with other embodiments whether or not explicitly described.

It would also be apparent to one skilled in the relevant art given this description that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "GIS" and "GIS system" are used herein interchangeably to refer broadly and inclusively to any type of geospatial or geographic information system (GIS) for archiving, retrieving, displaying or manipulating data indexed according to the data elements' geographic coordinates. The data elements may be a variety of data types such as, for example, satellite imagery, maps, models of buildings and terrain, and other geographic features. Further, data elements may include geo-located photographs of real world scenes corresponding to various geographic locations. For example, the geo-located photographs may correspond to a network of streets of a major metropolitan city. Such photographs may also include panoramic images. The photographs may then be rendered to a display using a substantially spherical three-dimensional (3D) model of a celestial body such as, for example and without limitation, the Earth. For example, the three-dimensional (3D) model may include satellite images texture mapped to terrain, such as mountains, valleys, and canyons. Further, the three-dimensional model may include buildings and other three dimensional features.

The terms "display" and "display screen" are used herein interchangeably to refer broadly and inclusively to any type of display for displaying and viewing digital media frames, including, but not limited to, video frames of real-world scenes and computer-generated digital graphics of, for example, a video game. Such displays can include, but are not limited to, cathode ray tube (CRT) monitors, liquid crystal display (LCD) screens, plasma display screens, projection screens, or other types of displays for viewing digital media content.

Visualizing Moving Objects in a GIS

Embodiments relate to providing animated visualization of global positioning system (GPS) data and other time-variant data associated with a moving object in a GIS (e.g., GIS 800 of FIG. 8, described further below). More specifically, embodiments enable the visualization of the movement of a real-world object represented in the GIS over time based on GPS data associated with the moving object. Examples of real-world moving objects that may be represented in the GIS include, but are not limited to, people, automobiles, aircraft, boats or other watercraft, and any other real-world object capable of moving between different geographic positions over time.

In an example, a moving object traveling in the real world between two different geographic locations may be equipped with a GPS device for capturing the changing geographic position of the object over time. As will be described in further detail below, the GIS may derive known positions for the moving object to be represented in the GIS based on the GPS data captured with the device. In an embodiment, the representation of the moving object in the GIS dynamically interpolates between known positions over time, thereby automatically generating an animation representing the motion of the object in the GIS. For example, changing positions of the moving object may be visualized as an animated icon or 3D model traveling along a path in an interactive 3D environment of the GIS.

Further, such an interactive 3D environment may be presented to a user in a geospatial browser (or simply "browser") of the GIS (e.g., geospatial browser 100 of FIG. 1, as described below). In an embodiment, the geospatial browser is both a spatial and temporal browser for viewing geographic information in the GIS. Further, various user interface controls provided in the browser enable the user to change the displayed spatial and temporal views as desired. Embodiments therefore enable the user to control both "where" and "when" in the GIS they are viewing by interacting with the animation of the moving object within 3D environment, e.g., by modifying a time-slider control provided in the browser (e.g., the time slider shown in FIGS. 2A-B, described below).

For example, the user can modify the current temporal view in order to browse changing data over time including, but not limited to, sunlight, historical imagery of geographic areas, etc. Accordingly, the user's manipulation of the controls will cause the object as represented in the GIS to dynamically move through both spatial and temporal views of the 3D world as appropriate. In this way, the motion of real-world objects in the GIS can be visualized in more dynamic and intuitive ways.

Figure 6:
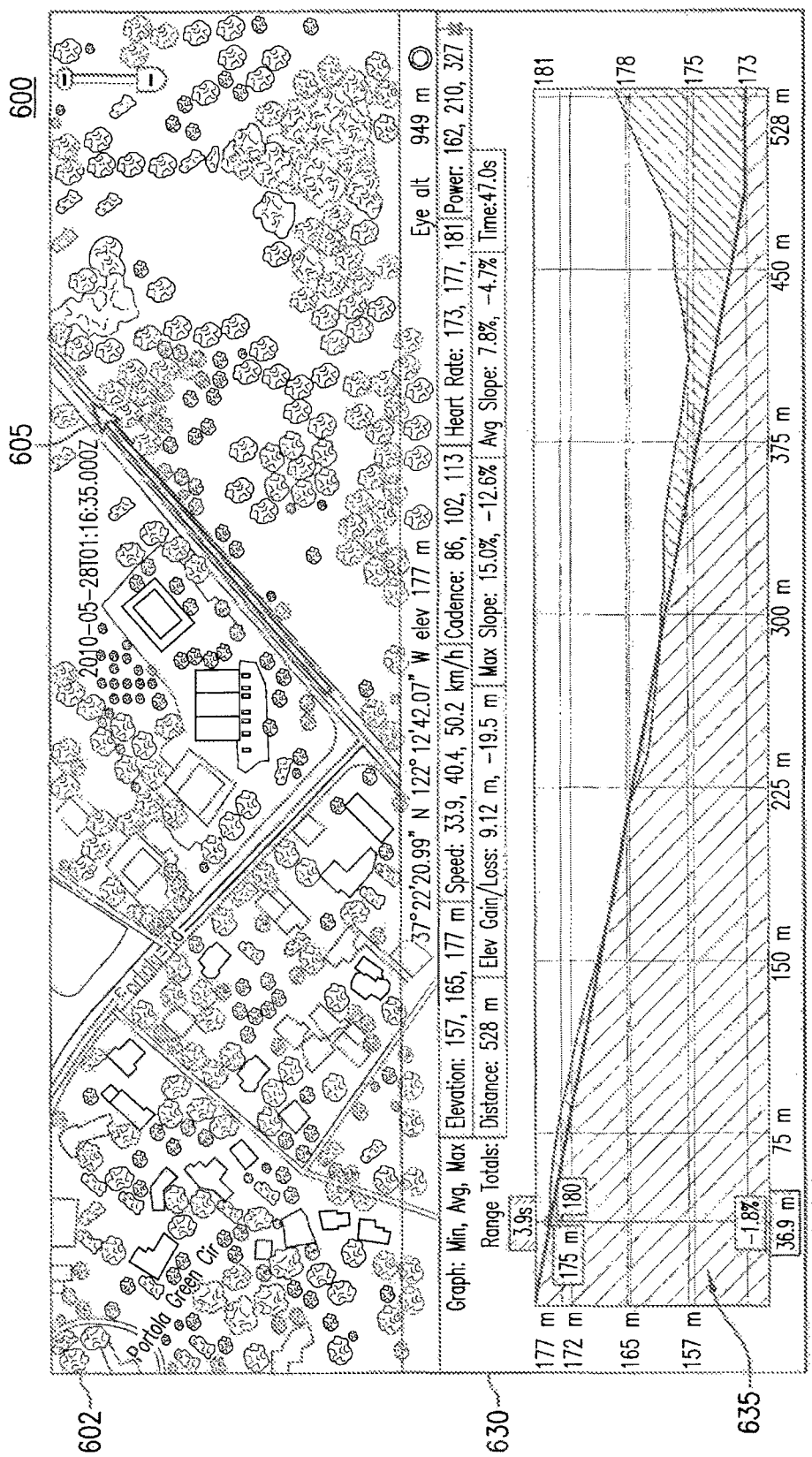
FIG. 6 illustrates an exemplary view of a geographic environment in a GIS showing different visualizations of time-dependent properties of a moving object, according to an embodiment.

In addition to the movement of a real-world object, the evolution of one or more time-variant or time-dependent properties of the moving object may be simultaneously visualized in the interactive 3D environment so as to match a current position of the moving object in the GIS. Examples of time-dependent properties that may be visualized include, but are not limited to, elevation, speed, cadence, heart-rate, distance, temperature, and power. For example, time-dependent data for a moving object may be captured using various sensor devices as appropriate that may be coupled to the moving object. An example visualization of such time-dependent data is illustrated in FIG. 6, and will be described in further detail below.

It would be apparent to a person skilled in the relevant art given this description that any type of well-known GPS device may be used to capture the GPS data associated with a moving object over time. For example, any dedicated GPS device or other mobile device with an integrated GPS receiver for capturing such data and an accessible digital storage medium for recording the captured GPS data may be used. Due to privacy reasons associated with tracking a user's location information, users generally are required to "opt-in" or choose to enable the location-tracking features of their respective mobile devices (e.g., by selecting the appropriate option in a device settings panel) before the device will track or record such location information.

Example GUI of a GIS Browser

FIG. 1 illustrates an exemplary graphical user interface (GUI) of an interactive geospatial browser 100 in a GIS system, according to an embodiment. In an embodiment, browser 100 is a spatial and temporal browser that enables a user to view various types of geographic information, corresponding to a particular geographic area at a specific time. As such, browser 100 provides the user with a notion of both "where" the user is viewing and "when" the user is viewing. In an example, browser 100 may enable the user to view imagery corresponding to one or more geographic regions or areas at various points in time as selected by the user (e.g., via a user interface control provided in browser 100). For example, such imagery may be presented to the user via a display that is coupled to a computing device implementing browser 100. As illustrated in the example GUI of FIG. 1, browser 100 includes a display window 102, a control portion 108 including data filters 110, and a time slider 120.

In an embodiment, display window 102 uses a viewport embedded within the browser 100 to present geographic data from the perspective of a virtual camera. In an embodiment, such a perspective is defined by a view frustum such as, for example, a truncated three-dimensional pyramid. Geographic data within the view frustum can be displayed at varying levels of detail depending on its distance from the virtual camera. Example geographic data displayed in display window 102 includes, but is not limited to, images of the Earth. It is noted that images of other planets (e.g., Mars) and/or celestial bodies (e.g., the Moon) may also be displayed in display window 100. For example, a 3D model of the Earth may be rendered in display window 102 by texture mapping satellite imagery of the Earth onto geometry representing the Earth's terrain.

In an embodiment, display window 102 presents spatial and temporal views of geographic information in a geographic environment. For example, the geographic environment as presented in display window 102 may include a 3D model of the Earth, rendered as an interactive 3D map or environment. As will be described in further detail below, the 3D geographic environment in display window 102 may feature one or more geographic areas of interest to the user based on user input (e.g., user interface controls provided in browser 100 and user-selected options in control portion 108).

Further, the geographic environment in display window 102 may include visualized GPS data associated with one or more moving objects represented in the GIS. For example, as noted previously, a moving object may be visualized as an animated icon or 3D model within the interactive 3D environment at a particular instance of time or during a span or window of time in the GIS. The geographic information including, for example, the geographical terrain and features displayed in the interactive 3D environment are updated in accordance with the current spatial and temporal view as specified for browser 100. For example, the current spatial and temporal view may be based on the geographic location and time information derived from the GPS data associated with the moving object.

In an embodiment, the user is provided various user interface controls in browser 100 that allow the user to modify one or more of such views. In the example shown in FIG. 1, a time slider 120 is one such user interface control for modifying the temporal view of the geographic information as it is presented in the 3D environment (and displayed in display window 102). For example, the user may manipulate time slider 120 (e.g., using a mouse or other input device coupled to a computing device that implements browser 100) so as to change the current temporal view of browser 100 as desired. In an embodiment, browser 100 may update the position and orientation of an animated icon or 3D model based on a selected time of time slider 120. For example, browser 100 may update in real-time the trajectory and orientation of an animated icon within the 3D environment as it is presented in display window 120. In a further embodiment, a visual trace of the path or track traveled by the animated icon is updated based on a selected time of time slider 120. The trace may include a tracking of an object's movements/location over a period of time. In an embodiment, browser 100 updates the view of the 3D environment as appropriate based on the temporal view selected by the user via time slider 120. For example, browser 100 may update in real-time the geographic information such as the terrain and other geographic features of the 3D environment as it is presented in display window 120.

Since all GPS satellites are synchronized to the same precise time (commonly referred to as "GPS time"), all GPS data is registered to "GPS time," regardless of the type of GPS device used to capture the data. Consequently, multiple sources of GPS data can be combined, for example, to generate different animations visualizing the motion of multiple and disparate moving objects in browser 100. In an example, the moving objects may be all of the boats in a boat race in which each boat has a GPS device for tracking its respective location over the course of the race. The GPS data captured for all of the boats in this example may be combined and visualized simultaneously within the interactive 3D environment of browser 100.

In the example illustrated in FIG. 1, an aerial perspective of an interactive 3D environment is displayed in display window 102. It is noted that such perspective of the geographic environment is shown for illustrative purposes only, and that embodiments are not intended to be limited thereto. It would be apparent to a person skilled in the relevant art given this description that geographic data may be displayed in the interactive 3D environment from any number of different perspectives. Such different perspectives for displaying content in browser 100 represent the different viewpoints from which the user can view the displayed content. As such, the user may change the viewpoint and perspective as desired, for example, by manipulating various user interface controls to modify the virtual camera's orientation and thus change the spatial views presented in display window 102.

As noted previously, the visualization of a moving object may include a graphical representation of the moving object within the interactive 3D environment presented in display window 102. According to an embodiment, a graphical representation, such as an icon or a 3D model, of the moving object may be appropriately positioned in the 3D environment presented in display window 102. Further, an animation moving the icon or 3D model along a path through the 3D environment can be displayed so as to visualize the changing positions of the moving object along a GPS track over time.

In a further embodiment, a visual trace of the path or track traveled by the moving object is also visualized in the 3D environment. The trace may include a tracking of an object's movements/location over a period of time. For example, display window 102 may be viewed at various time periods or time windows over the course of one or more time intervals. In an embodiment, display window 102 renders a visual representation of the moving object that includes an icon or 3D model of the object and a visual trace of the object's path as traveled in the 3D environment for a given window of time.

When viewing such a span or window of time in the interactive 3D environment, the visual trace may be drawn or rendered in display window 102 as a line along the path of the moving object between a start time and an end time. For example, the start and end times may define a current time window in which the moving object is to be represented in the GIS. In an embodiment, the start time corresponds to an initial position of the moving object and the end time corresponds to a current position of the moving object in the 3D environment. A graphical representation of the moving object such as an icon or 3D model is placed in the 3D environment at the appropriate position corresponding to the end or current time. Thus, the visual trace of the traveled path of the moving object in the 3D environment may start from the icon or 3D model, as positioned at a current or end time of a current time window, and extend towards the initial position of the moving object at the start time of the time window.

As described above, geographic location information associated with the moving objects over time may be provided by or otherwise received from GPS devices coupled to the moving objects for tracking such information as the object moves about the geographic area. Also as described above, the GPS data associated with a moving object may also include, but is not limited to, speed, location, altitude, direction, and other time-dependent properties of the particular moving object. The system described herein may then process and provide visual representations of some or all of this information as shown. Additionally, GPS systems often capture data at various time intervals (and not as a continuous flow of data at every moment). However, as noted above, the user may disable a GPS system's capability to track such location information (e.g., due to privacy concerns).

Assuming the user has willingly chosen to enable the capture of GPS location data, the system described herein may process the GPS information received about an object at a first time interval, and information about the object at a second time interval, whereby, the system herein may have to interpolate the information as to what the status of the object was in between the two captured data points.

In an embodiment, control portion 108 of browser 100 includes any number of filters, layers and/or other controls that may be selectable by a user. Based on a user's selections (and/or filters associated therewith), the rendered geographic environment in display window 102 may change accordingly. For example, control portion 108 may include selectable data filters 110. As shown in FIG. 1, data filters 110 may allow a user to select various objects and/or geographic features that the user desires to view in the 3D environment of display window 102. Selecting or deselecting data filters 110 may cause the traces and/or corresponding objects to appear or be removed, respectively, from display window 102. For example, as shown by the example in FIG. 1, the current trace for April 7 may not necessarily be displayed in display window 102.

In an embodiment, display window 102 further displays various user interface controls for changing the orientation of the virtual camera. Accordingly, such controls enable the user to change the perspective from which the geographic data is presented in display window 102. Such user interface controls may enable the user to modify the virtual camera's altitude, latitude, longitude, pitch, yaw, and roll as geographic data is visualized in display window 102. For example, the user may manipulate these controls using a computer pointing device such as a mouse. As the virtual camera's orientation changes, the virtual camera's frustum and the geographic information/data displayed also change. In addition to controls, browser 100 may also enable the user to control the virtual camera's orientation using other computer input devices such as, for example and without limitation, a computer keyboard or a joystick.

Display window 102 may be associated with a timeslider 120 that may represent a time period for which data is available about the geographic area or objects. Timeslider 120 may also indicate the current or selected time period being viewed in display window 102. Though shown horizontally, timeslider 120 may be oriented any way including, but not limited to, horizontally, vertically and/or diagonally.

Figure 2A:
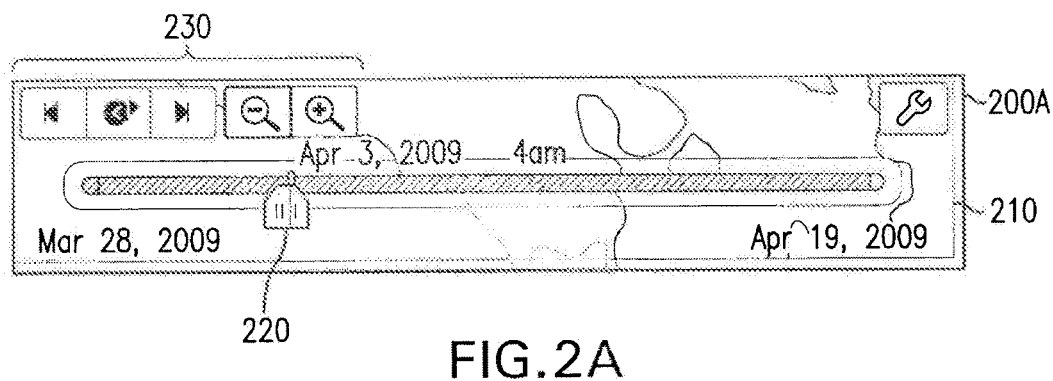
FIGS. 2A and 2B are example embodiments of a timeslider.
Figure 2B:
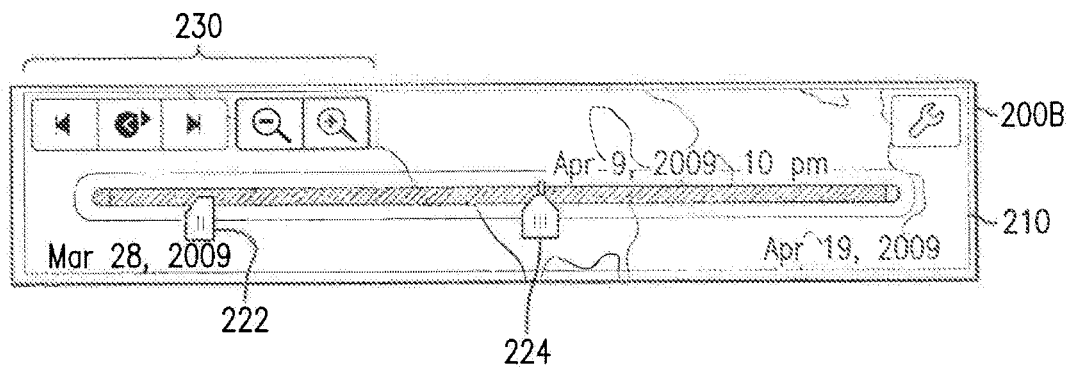

FIGS. 2A and 2B show exemplary time slider controls for modifying temporal views of the geographic information displayed in the GIS, according to an embodiment. As referenced above, the geographic environment represented in display window 102 may include or correspond to timeslider 120, for example, as in FIG. 2A as timeslider 200A and in FIG. 2B as timeslider 200B, individually, and referred to collectively as timeslider 120. Timeslider 120 may be used to view the geographic area as represented by display window 102 over a period of time or time interval.

Timeslider 120 may be a tool used to view display window 102 over at a time instance and/or over a time interval. Timeslider 120 may include a timescale 210 and menu selections 230. Timescale 210 may indicate an earliest and latest and/or range of selectable time values. For example, as referenced above, display window 102 may be viewable over a period of time. According to an example embodiment, display window 102 may be associated with timeslider 200A, which may include an earliest date of Mar. 28, 2009 and a latest date Apr. 19, 2009. The date and/or time range of timescale 210 may be determined based the availability of data for the geographic area and/or moving objects represented in geographic environment 105.

Timeslider 200A, as shown, includes a selector 220. Selector 220 may be used to select a time period or interval of time over which to display on the display window 102. Selector 220, as shown, is set to Apr. 3, 2009 at 4 am. Based on this selection, display window 102 may render the geographic area, including the moving objects in their relative positions as they existed (based on the available data) on the selected date (e.g., Apr. 3, 2009, at 4 am).

The timeslider 200B, of FIG. 2B, as shown, may include two selectors 222 and 224. These selectors may be used to indicate a time interval or window of time for which the user desires to see the display window 102. For example, an execution of the selections 222 and 224 of FIG. 2B may result in an animation or animated visualization being drawn upon the display window 102. The animation including a representation of one or more objects (e.g., placemarks) moving within display window 102 over the selected period of time. Moreover, each placeholder may include a track or trace (tail) showing the course the placeholder has traversed.

By contrast, an execution of the timeslider 200A selection 220 may include a rendering of the display window 102 at the selected time period. In an example embodiment, the placemarks may or may not include a tail or line from the earliest available time period showing the track each placemark has traversed up until the selected time period. For example, a user may opt to begin animation of the placemarks from the selected time period until the end of the available data (e.g., Apr. 19, 2009), or until the user stops the animation.

In conventional systems, animated visualizations such as those provided by the system discussed herein may not be possible. As referenced above, GPS systems periodically capture data about moving objects. As such, when this GPS information is used by conventional systems, an object may be drawn at first position for a first time period, and then removed and redrawn at a second position for a second time period. In this way, a gap is likely between the two positions (as a result of the missing or uncollected information from the GPS system).

The system described herein by contrast compares the values/position information received about the object at the first time period and the second time period. Based on a comparison, the system herein interpolates or otherwise fills in the likely missing information. For example, if an object is traveling at 60 miles per hour (mph) at a first time period, and traveling at 50 mph at a second time period in the same direction. The system herein may determine the likely (decreasing) speeds of the object during the time interval between the first time period and the second time period. As such, the system described herein, is able to provide a smooth animation for objects based on GPS data that may not include continuous information.

The menu selections 230 may allow the user additional options on manipulating the timescales 210, selections 220, 222, 224 and/or display window 102. In the example shown, the menu selections from left-to-right, may include a reverse button (e.g., to move the selections on the timescale 210 and/or animation of the display window 102 to an earlier point in time), a selection or bookmark button to select or mark a selected time interval (e.g., time span) or time instant (e.g., time stamp), a forward button, a zoom out button and a zoom in button to zoom out/in the display window 102. Other embodiments may include additional or other menu selections 230.

Figure 3:
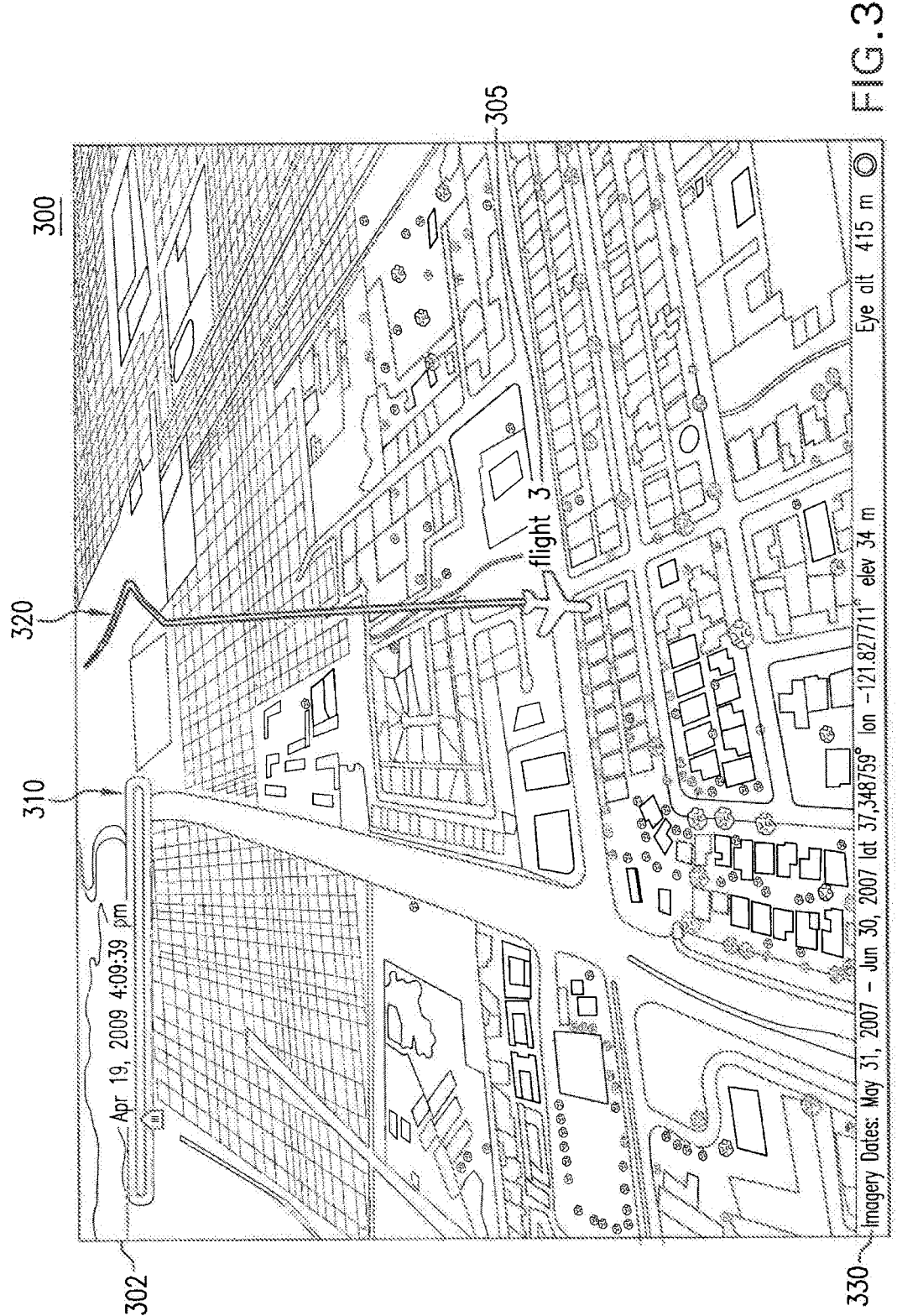
FIG. 3 illustrates an exemplary view of a geographic environment in the GIS, in accordance with an embodiment.

FIG. 3 illustrates an exemplary view 300 of a geographic environment 302, according to an embodiment. For example, geographic environment 302 may be an interactive 3D environment displayed in a display window or content viewer of a geospatial browser in a GIS (e.g., display window 102 in browser 100 of FIG. 1, as described above). In an embodiment, geographic environment 302 presents both a spatial view and a temporal view of geographic information and moving objects as visualized in the GIS. The temporal view of such content in geographic environment 302 may be based on an active time window.

In an embodiment, the active time window for geographic environment 302 is determined based on geographic positioning data associated with a moving object to be visualized therein. For example, the geographic positioning data may include a plurality of geographic locations captured over a period of time using a GPS device coupled to the moving object, as previously described. Further, each geographic location may be associated with a timestamp representing a real-world or GPS time when the particular geographic location was captured or recorded by the GPS device.

For example, a user of the GIS may view content (e.g., geographic information and moving objects) in geographic environment 302 at both an instant or span of time as defined by the active time window. An instant of time may correspond to a timestamp associated with the particular geographic location point at which a representation of the moving object is being visualized in geographic environment 302. A span or window of time may, for example, correspond to the entire active time window.

In an embodiment, a time slider 310 is provided in geographic environment 302 for enabling a user to modify the active time window and thus, the temporal view of the content visualized in geographic environment 302. In the example shown in FIG. 3, the view displayed in geographic environment 302 is an instant of time corresponding to "Apr. 19, 2009 at 4:09:39 pm." When viewing a span of time, a line is drawn along the path of the moving object between the start time and the end time, and the icon or 3D model is placed at the appropriate position for the end-time. By modifying time slider 310 (either manually or programmatically as in the case of a Tour) an animation can be created showing the moving object(s) with a tail subtending the object showing its path (e.g., as shown by visual trace 320 in FIG. 3).

Geographic environment 302 as shown in the selected time instant includes a graphical representation 305 of a moving object. In an embodiment, graphical representation 305 may include, but is not limited to, an icon, graphic, animation or other visual and/or textual representation of the moving object within geographic environment 302. As shown in the example illustrated in FIG. 3, the moving object represented in by graphical representation 305 is an airplane during flight.

Also as shown in FIG. 3, graphical representation 305 includes a visual trace 320 that represents the movement of the airplane along a continuous path in geographic environment 302 during a particular flight (denoted as "flight 3" in FIG. 3). As described previously, the continuous path traveled by graphical representation 305 and visual trace 320 may be automatically generated based on geographic positioning data associated with the airplane being represented.

In an embodiment, geographic environment 302 is presented to a user of a geospatial browser of a GIS (e.g., browser 100 of FIG. 1) from the perspective of a virtual camera. For example, such perspective may define a spatial view of geographic information displayed within geographic environment 302. As described above, the position and orientation of the virtual camera may be changed by the user by manipulating various controls provided in the geospatial browser.

In an embodiment, the geographic information (e.g., terrain and other geographic features) displayed in geographic environment 302 is automatically updated to match the changing camera position and orientation, as may be modified by the user via one or more user interface controls. For example, visual trace 320 as displayed in geographic environment 302 may extend beyond the current viewing area (e.g., as shown in display window 102). Thus, the user may use such interface controls to change the position and orientation of the virtual camera in order to view additional portions of the path represented by visual trace 320 beyond what may be currently displayed in geographic environment 302.

In an embodiment, an animation representing the movement of the moving object (e.g., an animation of geographic representation 305 of the airplane) along the continuous path (e.g., as represented by visual trace 320) is visualized or rendered in geographic environment 302. Accordingly, the virtual camera's position and orientation may be adjusted or changed based on the passage of time and/or the movement of the object 305 about one or more geographic areas.

In an embodiment, the active time window associated with geographic environment 302 is derived from geographic positioning data associated with the moving object to be represented in geographic environment 302. As shown in FIG. 3, geographic environment 302 may display an information bar 330 for presenting additional information corresponding to the views in the active time window. For example, the information bar 330 may display additional information associated with the views presented in geographic environment 302 based on the current position of the virtual camera at a given time (e.g., as specified by the user). Such additional information may include, for example and without limitation, dates of geographic imagery being displayed, latitude and longitude coordinates, and elevation information.

Figure 4:
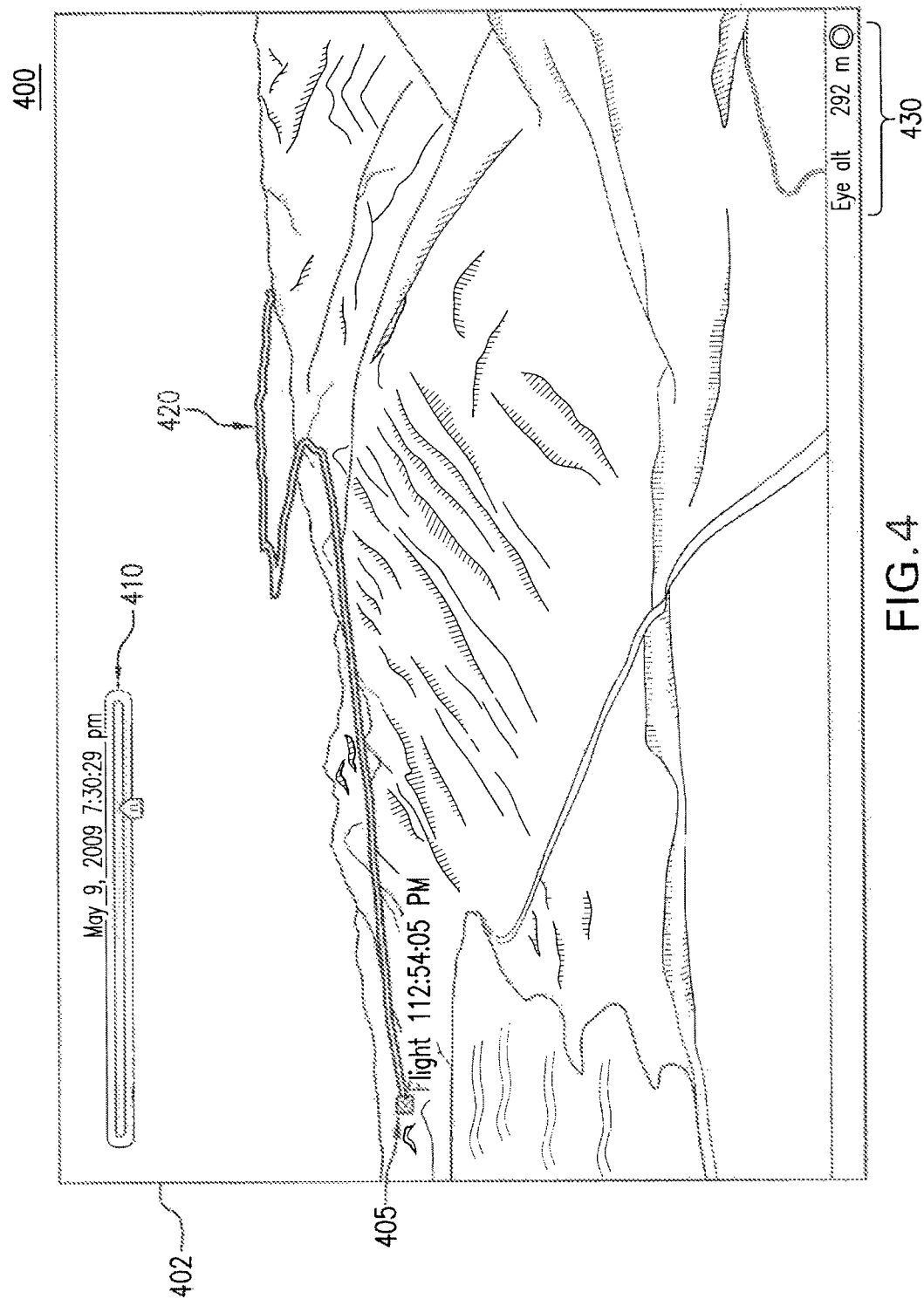
FIG. 4 illustrates another exemplary view of a geographic environment in the GIS, in accordance with an embodiment.

FIG. 4 illustrates an exemplary view 400 of a geographic environment 402, according to an example embodiment. Like geographic environment 302 of FIG. 3, described above, geographic environment 402 may be an interactive 3D environment presented in a geospatial browser of a GIS (e.g., browser 100 of FIG. 1, as described above), according to an embodiment. In geographic environment 402, a time slider 410 may be manipulated to view geographic environment 402 at different time intervals. The selected time instant shown is May 9, 2009 at 7:30:29 pm. As may be seen, graphical representation 405 may include or be associated with trace 420 representing the object's previous path over the geographic area as visualized in geographic environment 402.

In geographic environment 402, graphical representation 405 of an airplane may appear similar to the icons or placemarks shown for the objects in FIG. 1. According to an example embodiment, graphical representations of objects may vary or change based on a position of a (virtual) camera or perspective being used to view the environment, path and/or movements of objects. According to an embodiment, a virtual camera or perspective of a geographic environment positioned closer to an object's path may reveal a graphical representation with more detail than one positioned further away. For example, the graphical representations 305 and 405 both represent airplanes, whereby the graphical representation 305 has more detail as is viewed from a closer virtual camera than the graphical representation 405. The graphical representation(s) may also be selectable or provided by a user.

Also, as may be seen, geographic environment 402 may include details about a perspective or camera being used to view the object (e.g., graphical representation 405) about the terrain or geography, as shown in perspective information 430. Perspective information 430 may provide information about the camera or perspective being used to view geographic environment 402, including but not limited to, altitude, geographic position, angle, direction, and/or other information. As shown in FIG. 4, for example, the perspective information includes an altitude indication of 292 meters.

Example Encoding Language

FIG. 5 is a portion of code 500 that may be used to provide animated visualization of geo-located objects, according to an example embodiment. In an embodiment, code 500 may be based on the Keyhole Markup Language (KML) for encoding and visualizing geographic information and representations of one or more moving objects within a geographic environment (e.g., geographic environments 302 and 402 of FIGS. 3 and 4, respectively, as described above). As would be apparent to a person skilled in the relevant art given this description, KML in general may include various notations based upon XML (extensible markup language) notation for expressing geographic annotations and visualizations, as described above. Further, such visualizations may include two-dimensional and three-dimensional maps or environments encoded using KML notation. It should be understood that KML is an example coding language by which at least a portion of the features herein may be implemented, while other embodiments may use different encoding languages.

KML may allow for the representation of movement (of one or more objects) on and above the geographic environment. As shown in the code 500, a <placemark> may be used to move an object from a first position to a second position. The system described herein, may use <track> to move an object from point to point over two or more periods of time. A track may describe how an object moves through the world over a given period of time, where the object's position may be determined by manipulating a time slider as discussed herein.

The <track> element may be a parallel array in which time (when) elements correspond to location (coordinate) elements. The <track> element allows for multiple time elements to be associated with a given feature (e.g., placemark, ground overlay etc.). Conventional systems, which do not use the <track> element, may simply redraw objects at each point over several periods of time, which may result in the creation of large KML files and choppy animated features as a result of simply redrawing an object in various positions. By contrast, using the <track> element, may allow for smaller KML files to be processed and cleaner animations as described by the system herein. For example, in FIG. 5, each <when> element may include a time period for which GPS data was received about an object's whereabouts (e.g., location), and each <when> element may correspond to a <gx:coord> element that provides the coordinates or position of the element at that moment in time. Then for example, the first <when> element may correspond to the first <gx:coord> element, and the object may move from the first <gx:coord> element to the second <gx:coord> element by the second <when> element.

Example Visualization of Time-Dependent Properties

As previously described, the evolution of one or more time-variant or time-dependent properties of the moving object may be visualized simultaneously with the movement of a real-world object in the interactive 3D environment so as to match a current position of the moving object in the GIS. Examples of such time-dependent properties that may be visualized include, but are not limited to, elevation, speed, cadence, heart-rate, power, distance, temperature, and power. For example, time-dependent data for a moving object may be captured using various sensor devices as appropriate that may be coupled to the moving object.

FIG. 6 illustrates an exemplary view 600 of a geographic environment 602 that includes a visualization of changing elevation data associated with a moving object over time, according to an embodiment. In the example shown in FIG. 6, object 605 in geographic environment 602 represents a moving object traveling along a continuous path between geographic locations over a period of time. As described above, a GPS device and various sensors coupled to the moving object can be used to track geographic location and other time-dependent properties of the moving object including, for example and without limitation, location (e.g., longitude and latitude), direction, elevation, speed, slope, heart rate, etc.

In an embodiment, the time-dependent data associated with the moving object may be processed and graphically visualized in a display window 630 of geographic environment 602. As shown in FIG. 6, display window 630 may be used to display changing values of particular time-dependent properties as the moving object travels through geographic environment 602 over time. In an embodiment, display window 630 visualizes selected time-dependent properties. The particular time-dependent properties visualized may be selected by the user via, for example, one or more user interface controls provided in geographic environment 602.

In the example shown in FIG. 6, an elevation chart 635 represents an elevation profile for the moving object represented by object 605 moving along a continuous path in geographic environment 602 over time (e.g., during an active time window of geographic environment 602, as described above). Accordingly, the visualized time-dependent elevation data associated with object 605 in chart 635 may be used to track the elevation and distance traveled for the object. For example, the Y-axis of chart 635 may display the elevation, and the X-axis may display the corresponding distance.

Further, the visualization of object 605 may be automatically updated in accordance with user input associated with chart 635. time-dependent properties associated with object 605 may be based on user input. For example, the user may select various portions of the elevation profile displayed in chart 635 When you move the cursor through the various parts of the Elevation Profile, the arrow moves along your path and displays the elevation (left side of arrow) and cumulative distance (above the arrow). The % number displayed represents the % grade or slope.

As shown, graph 635 provides a smooth representation of the elevation and slope even though data received from the moving object's GPS or other system may not have provided information for every moment of time. As discussed above, the system as described herein, may determine the missing or absent information based on various other data at other provided time instances and provide the smooth renderings shown and described herein.

Method

Figure 7:
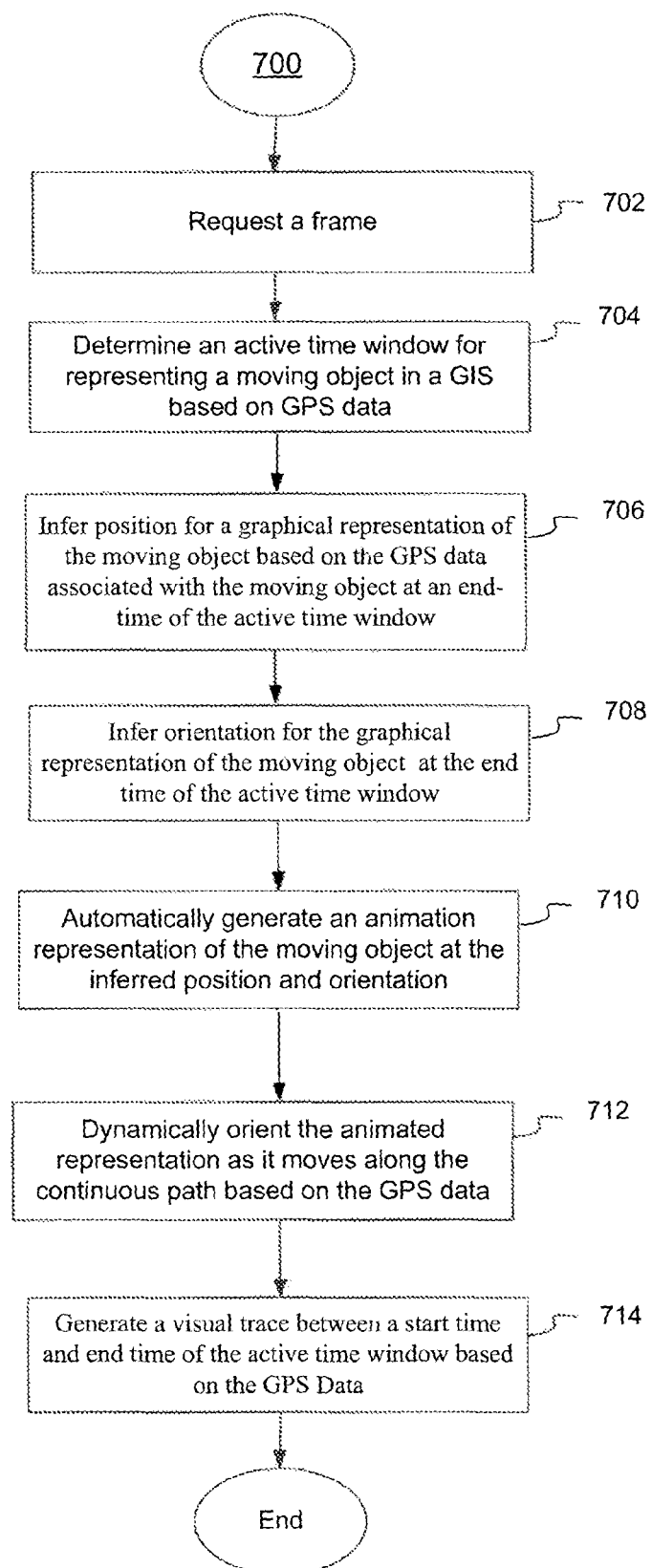
FIG. 7 is a flowchart for providing animated visualization of geo-located objects in a GIS, according to an example embodiment.

FIG. 7 is an exemplary process flowchart 700 for providing animated visualization of geo-located objects in a GIS system, according to an embodiment. Embodiments of method 700 will be described below with respect to one requested frame of a geographic environment and one geo-located object in the GIS system. However, it should be understood that a system may request multiple frames. Additionally, it should be understood that the frame of the geographic environment may include visualized GPS data associated with one or more moving objects represented in the GIS. Accordingly, method 700 may be repeated for one or more frames and the one or more moving objects represented in the GIS.

Method 700 begins at step 702, in which a frame is requested. For example, a digital media frame, including, but not limited to, video frames of real-world scenes and computer-generated digital graphics of, for example, a video game may be requested by a system for display. The frame may include one or more moving objects within a geographic environment.

In step 704, an active time window for representing a moving object in the GIS is determined based on GPS data associated with the moving object. For example, such GPS data may be captured using a GPS device coupled to the moving object, as previously described. In another example, the GPS data may be based on a user-input or programmed animation parameters for the moving object. Further, such GPS data may include, but is not limited to, a series of geographic location points (e.g., sets of latitude and longitude coordinates) and corresponding timestamps. For example, each timestamp may represent a real-world time (or "GPS time") at which the corresponding location point was sampled by the GPS device.

In step 706, a position for a graphical representation of the moving object may be determined based on the GPS data associated with the moving object at the end-time of the active time window. For example, the graphical representation may include an icon or 3D model of the moving object within an interactive 3D environment of the GIS. A start and end time may define a current time window in which the moving object is to be represented in the 3D environment. In an embodiment, the start time corresponds to an initial position of the moving object and the end time corresponds to a current position of the moving object in the 3D environment. The GPS data associated with the start and end time may be compared and the path that the moving object traveled may be interpolated. For example, if an object is traveling at 60 miles per hour (mph) at a start time, and traveling at 50 mph at an end time in the same direction for the active time window, the likely (decreasing) speeds of the moving object may be determined during the time interval of the start and end time. As a result of the comparison of the GPS data at the start and end time, the position of the moving object at the end time of the active time window may be inferred.

In an embodiment, known positions are determined for a graphical representation of the moving object to be displayed during the active time window of the GIS based on the GPS data associated with the object at the end-time of the active time window. A person skilled in the relevant given this description would appreciate that GPS devices generally do not capture a continuous stream of location data at every moment. The GPS data associated with the moving object to be represented may include only a subset of the geographic location points traveled by the moving object over time. Therefore, conventional techniques may present only static displays of an object's changing position over time, which may comprise, for example, a collection of points corresponding to such known positions.

In step 708, the orientation for the graphical representation of the moving object is determined at the end time of the active time window. For example, the appropriate orientation of the representation may be inferred based on the trajectory of the moving object or a user-specified orientation at the end of the time window. As would be apparent to a person skilled in the relevant art given this description, such trajectory may be determined from the GPS data using any one of well-known techniques.

In an embodiment, the trajectory and orientation may be determined by applying a mathematical model of the motion capabilities of the particular type of moving object being represented. Further, the inferred orientation may be calculated for a given time and position based on the type of moving object being represented. This enables the moving object to be visualized in the interactive 3D environment so as to be visually pleasing to the user, with little or no disorientation. For example, the mathematical model may be different for planes, cars, people, etc., and can specify equations relating the object's motion to the inferred pitch/yaw/roll. In addition, limitations on the object's ability to change direction can also be specified, for example, by changing the inferred path of the object through the world based on the same measurements.

In contrast to such conventional techniques, method 700 enables the motion of the moving object between known locations within the active time window to be visualized dynamically within the interactive 3D environment or world displayed by the GIS, as previously described. Accordingly, in step 710, an animation of the graphical representation of the moving object is automatically generated at the determined position and orientation. For example, a graphical representation of the moving object such as an icon or 3D model is placed in the 3D environment at the appropriate position corresponding to the end time or current time. Additionally, the graphical representation of the moving object is visualized as moving along a continuous path in the 3D world between the determined known positions, discussed previously.

Further, in step 712, the animated representation is dynamically oriented as it is moved along the continuous path based on the GPS data. In one example, the GPS data may include information that specifies the orientation of the moving object at each geographic location point and time. In this case, the animation may be generated by interpolating the orientation of the representation of the moving object between the known positions along the continuous path in the 3D world. In a different example, the GPS data may not include such orientation information. In this example, the appropriate orientation of the representation may be inferred as the visualized animation moves along the path based on a determined trajectory of the moving object. As would be apparent to a person skilled in the relevant art given this description, such trajectory may be determined from the GPS data using any one of well-known techniques.

At step 714, a visual trace is generated between the start and end time of the active time window based on the GPS Data. In an embodiment, a visual trace may be rendered based on the GPS data between a start and end time of an active time window. For example, the visual trace may represent a line along the path of the moving object between a start and end time. As stated, previously, the graphical representation of the moving object is placed in the 3D environment at the appropriate position corresponding to the end or current time. Consequently, the visual trace of the traveled path of the moving object in the 3D environment may start from the icon or 3D model, as positioned at a current or end time of a current time window, and extend towards the initial position of the moving object at the start time of the time window.

In an example, the animated visualization is presented in the 3D world from the perspective of a virtual camera. In an embodiment, one or more parameters of the virtual camera (e.g., pitch, yaw, and roll) may be dynamically updated to present a smooth animation as it is visualized along the continuous path in the three-dimensional world.

An important benefit provided by method 700, as described above, is that since all real-world GPS data is registered to real-world time, multiple sources of GPS data can be easily combined to create animations of the motion of multiple objects. For example, all sailboats in a race could be visualized simultaneously, or all planes in flight across the US could be visualized. Also, importantly, visualizations of multiple objects can be created from totally different data-sources without the need to have both data sources.

For example, two or more different sets of GPS data corresponding to different moving objects to be represented in the GIS (e.g., encoded in two or more different KML files to be processed by the GIS) may be received. Accordingly, embodiments enable the real-time animation and visualization for all of these different moving objects simultaneously (e.g., as moving through the interactive 3D environment displayed by the GIS, as described above).

System

Figure 8:
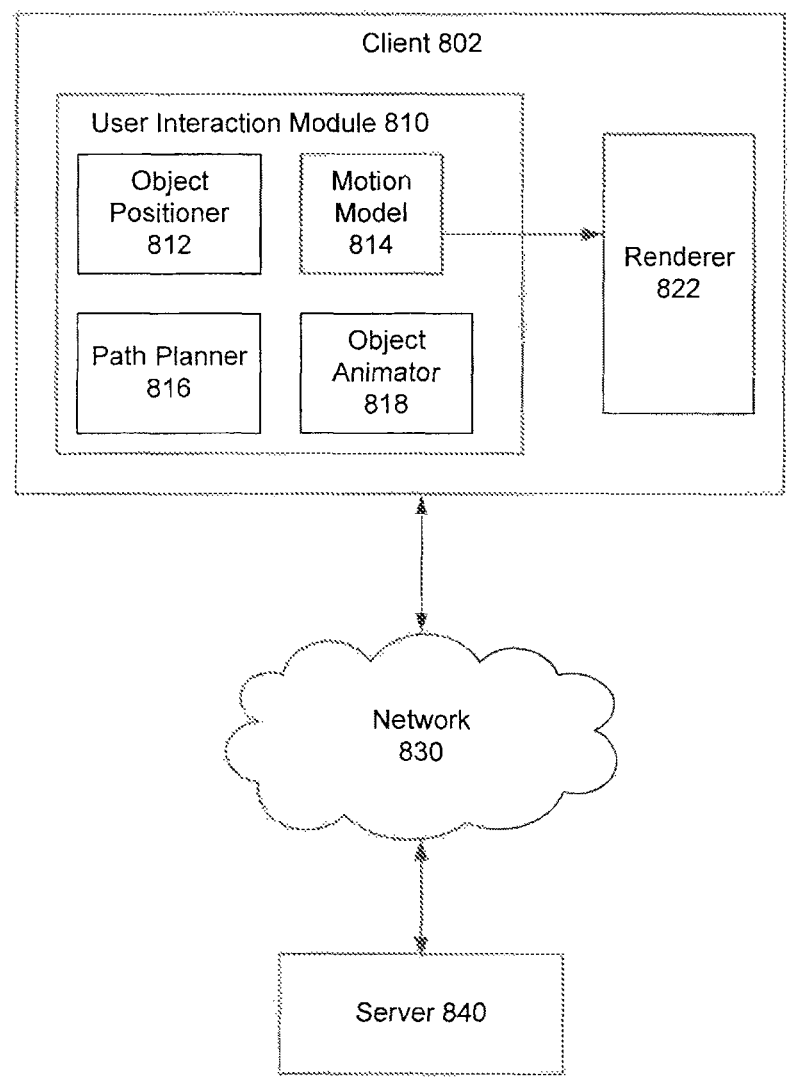
FIG. 8 illustrates a system for providing animated visualization of geo-located objects in a GIS, according to an example embodiment.

FIG. 8 illustrates a system 800 for providing animated visualization of geo-located objects in a GIS, according to an example embodiment. The system 800 may include a GIS or other system as described above for rendering moving objects, and information associated therewith, in geographic environments. According to an example embodiment, the system 800 may be implemented in a client-server environment as shown.

Client 802 may include any computing device, or number computing devices, including one or more processors. Client 802 may communicate with a server 840 via a network 830. Network 830 may include any wired and/or wireless communications network, such as the Internet, an intranet and/or a cellular network. Server 840 may receive information from and/or provide information to client 802. For example, server 840 may provide GPS and/or GIS information for one or more objects to client 802.

A user interaction module 810 may allow a user to interact with the geographic environments that may be rendered by a renderer 822. Object positioner 812 may determine the position of a moving object within the geographic or three-dimensional environments discussed above at various moments in time. For example, as discussed above, GPS data for a moving object may only include data for specified or period time intervals. Object positioner 812 may plot or determine these positions relative to the geographic environments to be rendered. According to an example embodiment, object positioner 812 may plot longitudinal and/or latitudinal coordinates within a geographic environment.

In an embodiment, object positioner 812 may be configured to determine an active time window of the geographic information system based on geographic positioning data associated with the moving object to be visualized in the interactive 3D environment of the geographic information system, as described above. Further, object positioner 812 may also determine one or more positions of the moving object within the active time window based on the geographic positioning data associated with the moving object, according to an embodiment.

Motion model 814 may determine the motion, or likely motion, of objects between the time periods for which data is provided by a GPS or other system. For example, if object positioner 812 plots an object at point A at a first time for which GPS data has been provided, and at point B at a second, consecutive time for which GPS data has been provided, motion model 814 may determine the motion by the object during the time interval as the object moves from point A to point B.

In an embodiment, the object is displayed or rendered within the interactive three-dimensional (3D) environment of the GIS from the perspective of a virtual camera. Such perspective may be defined by a view frustum such as, for example, a truncated three-dimensional pyramid. Geographic data within the view frustum can be displayed at varying levels of detail depending on its distance from the virtual camera. Example geographic data displayed in the geographic environment includes images of the Earth. However, it is noted that images of other planets (e.g., Mars)

and/or celestial bodies (e.g., the Moon) may also be displayed depending on the particular geographic data being displayed. For example, these images can be rendered onto a geometry representing the Earth's terrain creating a three dimensional model of the Earth. Other data that may be displayed include three dimensional models of buildings corresponding to city blocks.

In an embodiment, the GIS also displays user interface controls for changing the virtual camera's orientation. For example, such controls may enable a user to change the virtual camera's altitude, latitude, longitude, pitch, yaw and roll. In an embodiment, these controls are manipulated using any user input device or computer pointing device (e.g., a mouse). As the virtual camera's orientation changes, the virtual camera's frustum and the geographic information/data displayed also change. In addition, a user may also control the virtual camera's orientation using such computer input devices including, for example and without limitation, a computer keyboard, mouse, joystick, game controller, microphone, and touchscreen display.

Path planner 816 may define a path of a virtual camera in the geographic environment based on the positions plotted or otherwise determined by object positioner 812 (and the track charted by motion model 814). Path planner 816 may determine (and/or receive from a user) preferred virtual cameras from which to view the trace or path of one or more moving objects. According to an example embodiment, multiple virtual cameras may be used during the course or tracking of an object over one or more time intervals. In an embodiment, path planner 816 may be further configured to dynamically orient a graphical representation of the moving object (e.g., icon or 3D model) as it is rendered in the interactive 3D environment. For example, the orientation of the virtual camera by path planner 816 may be based on the type and positions of the moving object as represented in the 3D environment during the active time window, as will be described in further detail below with respect to FIG. 10.

In an embodiment, an object animator 818 may automatically generate, in real-time, an animation of a graphical representation of an object moving within the geographic environment. Object animator 818 may provide or visualize a smooth transition of the object from a first position to a second position. For example, if an object is going straight at a first time interval, and then moving left at a second consecutive time interval, object animator 818 may animate a visual representation of the object (e.g., such as an airplane) showing the airplane smoothly turning left between the first time interval and the second time interval.

Renderer 822 may dynamically render or visualize an animation in the geographic environment. For example, based on the views associated with virtual camera(s), renderer 822 may draw or generate animations in the geographic environments representing the object(s) movement through the geography over a period of time based on the GPS data received or determined by system 800. Renderer 822 may render animations of the objects as they move from point to point within the geographic environment.

Generating Cinematic FlyBy Sequences for Visualized GPS Data

As described above, embodiments enable the animation of a graphical representation of a moving object (e.g., an icon or 3D model) in an interactive 3D environment or world displayed in a GIS (e.g., GIS 800 of FIG. 8). For example, object animator 818 of GIS 800 may be used to animate an icon/3D model along a path in the 3D world according to GPS data. In an embodiment, cinematic tour including flyby sequences of a virtual camera may also be automatically generated and visualized within the 3D environment in addition to the visualized animation of the graphical representation of the moving object. For ease of explanation, the graphical representation will be assumed to be a 3D model. However, embodiments are not intended to be limited thereto.

FIG. 10 shows an exemplary screenshot of a cinematic tour of visualized GPS data in a geographic environment 1000, according to an embodiment. Additionally, a 3D model 1002 is represented as a moving object within the cinematic tour. For example, geographic environment 1000 may be an interactive 3D environment displayed in a geospatial browser of a GIS (e.g., GIS 800 of FIG. 8), as described above. As shown in FIG. 10, cinematic flyby sequences with the 3D model of the moving object 1002 may be visualized from the perspective of a virtual camera.

In an embodiment, the position and orientation of the 3D model 1002 may be determined within the cinematic tour. As discussed previously, the 3D model 1002 may include GPS data at various moments in time. For example, GPS data for the 3D model 1002 may include geographic positioning data for specified or period time intervals. One or more positions of the 3D model 1002 may be determined based on the geographic positioning data associated with the 3D model. The position and orientation of the 3D model 1002 may be updated based on the geographic positioning data. For example, the motion, or likely motion, of the 3D model 1002 may be determined between the time periods for which data is provided by a GPS or other system. If 3D model 1002 is positioned at point A at a first time for which GPS data has been provided, and at point B at a second, consecutive time for which GPS data has been provided, the motion of the 3D model 1002 may be determined during the time interval as the object moves from point A to point B.

In an embodiment, the trajectory and orientation of 3D model 1002 may be determined and represented within the cinematic tour by applying a mathematical model of the motion capabilities of the particular type of moving object being represented. For example, the mathematical model may be different for planes, cars, people, etc., and can specify equations relating the object's motion to the inferred pitch/yaw/roll. FIG. 10 illustrates the 3D model 1002 as an airplane. Thus, equations related to a mathematical model of a plane will be applied to determine the trajectory and orientation of 3D model 1002. Furthermore, the orientation of 3D model 1002 may be calculated for a given time and position based on the type of moving object being represented. In a further embodiment, a visual trace of the path 1004 or track traveled by the 3D model of the moving object 1002 is updated as the object moves. The trace may include a tracking of an object's movements/location over a period of time.

In an embodiment, the position and orientation of the virtual camera for such cinematic flyby sequences may be dynamically adjusted so as to maintain focus on the 3D model of the moving object 1002 while maintaining spatial context and minimizing disorientation and nausea for the user. As such, one goal for embodiments as described herein is to provide users with a "one-button" solution for automatically generating cinematic fly-by sequences based on GPS data associated with a moving object. Further, embodiments may enable users to view an animation of the 3D model of the moving object as it travels along a continuous path 1004 in the 3D environment in an aesthetically pleasing manner.

In an embodiment, users can create cinematic flights to be visualized in the 3D environment using an encoding language for representing geographic information in the GIS. For ease of explanation, embodiments are described using the KML encoding language as shown in FIG. 5 and as described above. However, embodiments are not intended to be limited thereto. In an example, a <gx:Tour> extension may be added to the KML language. In short, a "Tour" feature allows users to script a fly-through sequence which specifies how to fly the to key camera positions over time. When playing back such experiences, the camera will automatically fly through space and time as specified. Additional features and characteristics of KML and specifying Tours using KML would be apparent to a person skilled in the relevant art given this description.

In one embodiment, a KML Tour object is created corresponding to the flyby sequence. However, it is noted that embodiments are not intended to be limited thereto. It would be apparent to a person skilled in the relevant art that other embodiments may be used to write the resulting camera path to a different kind of representation, for example, by generating keyframes comprising views of geographic information in a different 3D software camera path language. Alternatively, virtual camera positions for each frame of a digital movie may be generated directly.

In an embodiment, user interface controls or settings corresponding to various virtual camera parameters are provided to the user for high-level creative control over the tour creation including, but not limited to, speed, camera range, tilt, etc. For example, a tour generation system in the GIS may use these settings as a rough template for the tour creation, but may deviate from the settings in order to maximize the desirable visual qualities discussed above.

An example of such a setting is the speed to traverse a path or track of the 3D model in the virtual environment. In an embodiment, tracks representing visualized GPS data may be a multiple of real-time. For example, if the GPS data represents one hour, a speed value of "1.0" may result in a tour that takes approximately one hour to playback. For other representations (e.g., lines) showing the changing position of a moving object, a speed value in miles-per-hour may be provided.

Adaptive Keyframe Focus-Point Selection

In an embodiment, a tour of geographic information in the 3D environment may be specified as a series of fly-to commands to key viewpoints. The focus-points of these keyframes are selected adaptively, along the track based on an analysis of the track, given the settings described above. The purposes of the keyframe focus-point selection may include, but are not limited to, limiting the number of keyframes to minimize file-size and increasing smoothness of the visual representation of the animated 3D model while also minimizing jerky motion that may produce disorientation for the user.

For example, the captured GPS data associated with a moving object may include abrupt changes in movement, direction, or speed. However, embodiments provide a way to avoid such issues when visualizing the GPS data from the perspective of the virtual camera. As such, any abrupt changes associated with the movement of the object in the 3D environment can be avoided in the camera motion. For example, the object of interest (i.e., the animated 3D model) in the 3D environment may therefore be allowed to deviate from the exact center of the screen.

In an embodiment, the track/line representing the continuous path traveled by the animated object in the 3D environment is kept in the visual field of the display. For example, it may be visually pleasing to have some amount of drift of the object of interest from the exact center of the screen; however, the track/line should generally stay well within the visual field of the animation. Generally, the more keyframes that are selected, the more precisely the virtual camera will follow the trajectory of the line. In a different embodiment, heuristics of camera drift and jerkiness are used to make a trade-off between additional jerkiness associated with following the track very precisely, and the greater drifting of the virtual camera away from the line. In an embodiment, such heuristics may be used variably throughout the generation of the path.

In an embodiment, the virtual camera's position with respect to those keyframes for which focus points were chosen are generated in a KML <LookAt> representation. For example, such a representation may include a range, tilt, and heading to match the camera points at the chosen focus point at the Keyframe.

Adaptive Camera Range/Tilt

In an embodiment, values associated with the virtual camera's range and tilt parameters are selected adaptively selected for generating such a KML <LookAt> representation for a particular focus point. For animations of GPS traces, the speed of the camera varies over time to match the speed of the GPS unit. For example, when following a fast-moving object, visual continuity is best preserved by moving the camera farther away from the object and towards a more overhead perspective. Further, as the object slows down, moving the camera closer to the object provides greater focus.

Range/Tilt Dependent Camera Rotation and Speed

In an embodiment, values associated with the virtual camera's rotation and speed are adaptively selected based on its range and tilt at a given position and time. For example, the ideal camera position for following a line/track may be directly behind the progression of the track. This can be inferred from the heading of the track/path. However, if the path turns abruptly, immediately updating the camera rotation can be disorienting. The rotational velocity (delta-heading) that leads to disorientation is dependent on the camera range and tilt, as described above. In an embodiment, damping may be applied to the camera rotation that effectively allows for a maximum rotation speed. In an embodiment, the maximum speed may be calculated per-keyframe depending on the camera range and tilt. From these limits, the heading for each keyframe may also be determined.

Example Computer System

Figure 9:
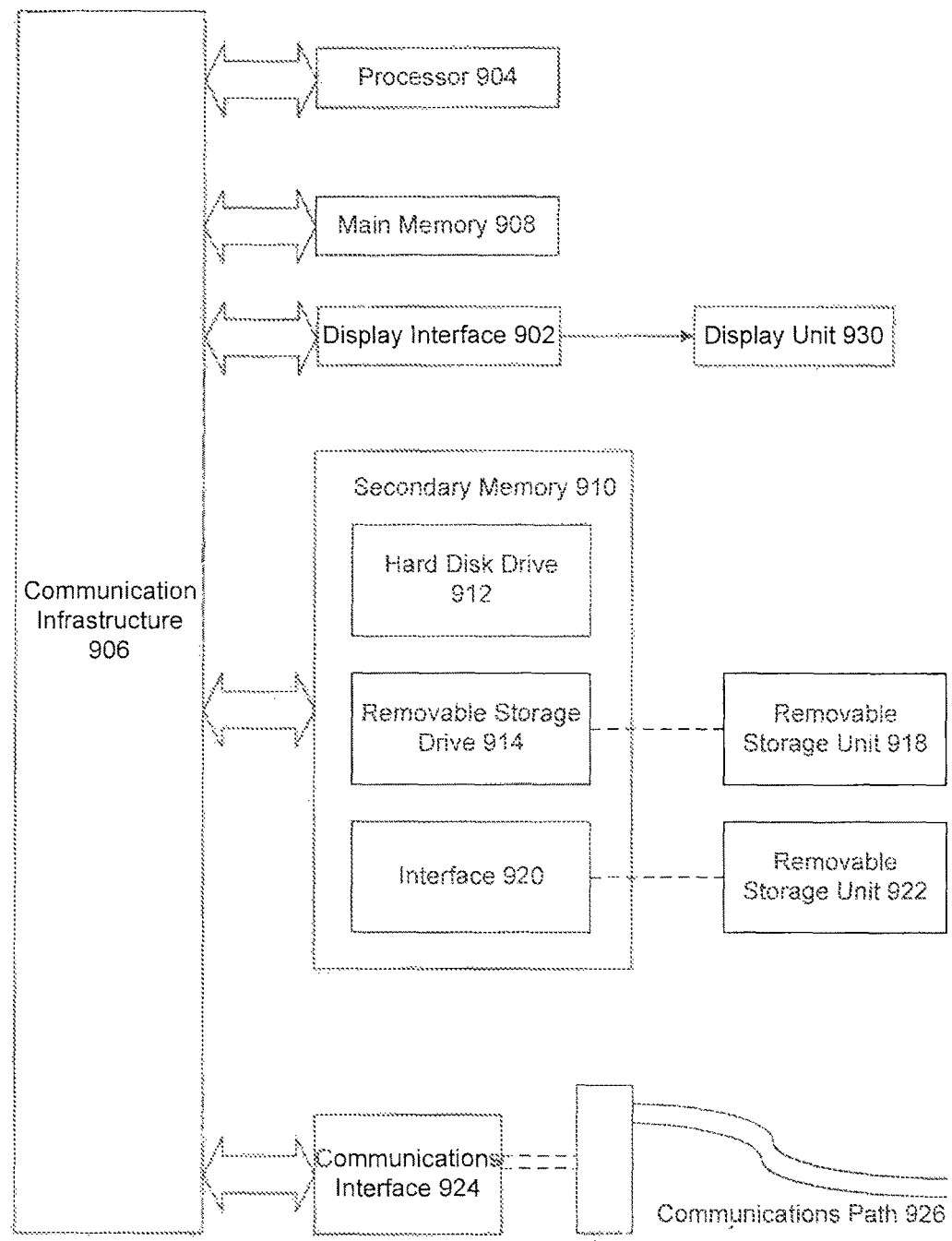
FIG. 9 illustrates an example computer system in which embodiments of the present invention, or portions thereof, may be implemented.

FIG. 9 illustrates an example computer system 900 in which embodiments of the present invention, or portions thereof, may be implemented as computer-readable code. For example, client 802 and/or server 840 may be implemented in computer system 900 using hardware, software, firmware, tangible computer readable media having instructions stored thereon, or a combination thereof and may be implemented in one or more computer systems or other processing systems. Hardware, software, or any combination of such may embody any of the modules, procedures and components in FIGS. 1-8.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, or computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general-purpose processor device. As will be appreciated by persons skilled in the relevant art, processor device 404 may also be a single processor in a multi-core/multiprocessor system, such system operating alone, or in a cluster of computing devices operating in a cluster or server farm. Processor device 904 is connected to a communication infrastructure 406, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, removable storage drive 914 and interface 920. Removable storage drive 914 may comprise a floppy disk drive, a magnetic tape drive, an optical disk drive, a flash memory, or the like. The removable storage drive 914 reads from and/or writes to a removable storage unit 918 in a well-known manner. Removable storage unit 918 may comprise a floppy disk, magnetic tape, optical disk, etc. which is read by and written to by removable storage drive 914. As will be appreciated by persons skilled in the relevant art, removable storage unit 918 includes a computer usable storage medium having stored therein computer software and/or data.

Computer system 900 (optionally) includes a display interface 902 (which can include input and output devices such as keyboards, mice, etc.) that forwards graphics, text, and other data from communication infrastructure 906 (or from a frame buffer not shown) for display on display unit 930.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of the present invention, such as the stages in the method illustrated by the flowchart in FIG. 7 discussed above. Accordingly, such computer programs represent controllers of the computer system 900. Where the invention is implemented using software, the software may be stored in a computer program product and loaded into computer system 900 using removable storage drive 914, interface 920, and hard disk drive 912, or communications interface 924.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for animated visualization of geo-located objects in a geographic information system, comprising:

determining, by one or more computing devices, a first position of a first moving object to be visualized at a first time in an interactive three-dimensional environment of the geographic information system based on past geographic positioning data associated with the first moving object over a past period of time;

positioning, by the one or more computing devices, a graphical representation of the first moving object at the first time in the interactive three-dimensional environment according to the determined first position;

determining, by the one or more computing devices, a second position of the first moving object to be visualized at a second time in the interactive three-dimensional environment based on the geographic positioning data associated with the first moving object;

defining, by the one or more computing devices, a first path of a virtual camera in the interactive three-dimensional environment based on the determined first and second positions of the first moving object at the respective first and second times, the first moving object to be visualized in the interactive three-dimensional environment from a perspective of the virtual camera, wherein defining the first path further comprises selecting one or more keyframes along the first path, a focus-point of each keyframe being chosen adaptively based on an analysis of the first path, wherein the more keyframes selected will cause improved precision of the virtual camera following the first path;

automatically generating in real-time, by the one or more computing devices, an animation of the graphical representation of the first moving object comprising a three-dimensional model in the interactive three-dimensional environment based on the defined first path of the virtual camera so as to visualize a smooth transition of the first moving object from the first position at the first time to the second position at the second time in the interactive three-dimensional environment;

dynamically rendering, by the one or more computing devices, the generated animation and views of geographic information within the interactive three-dimensional environment on a display from the perspective of the virtual camera moving along the first path from the first position to the second position;

enabling a user to manually adjust the rendered views of the geographic information in the interactive three-dimensional environment using a user interface control provided in the interactive three-dimensional environment, wherein the user interface control is a time slider control that enables the user to manually adjust the time window in the interactive three-dimensional environment; and dynamically updating in real-time the rendered animation and the rendered views of the geographic information on the display based on input received from the user via the provided user interface control, wherein the period of time is an adjustable time window in the interactive three-dimensional environment, and the dynamically updating comprises adjusting the time window in the interactive three-dimensional environment in accordance with the input received from the user via the time slider control and dynamically updating the rendered animation and the temporal view of the geographic information based on the adjusted time window.

2. The method of claim 1, wherein the dynamically rendering the generated animation further includes dynamically rendering a visual trace in association with the first moving object so as to visually track a movement of the first moving object along the first path in the interactive three-dimensional environment, the visual trace extending along the first path from a point on the first moving object positioned at the second position at the second time to the first position at the first time.

3. The method of claim 1, wherein the defining comprises:
interpolating the first path of the virtual camera in the interactive three-dimensional environment based on the determined first and second positions of the first moving object in the interactive three-dimensional environment.

4. The method of claim 1, wherein the geographic positioning data is encoded using an encoding language, and the encoded geographic positioning data is interpreted to derive the first and second positions of the first moving object at the respective first and second times in the interactive three-dimensional environment.

5. The method of claim 1, wherein the geographic positioning data associated with the first moving object includes geographic location information, time information, and elevation information associated with the first moving object over the period of time.

6. The method of claim 5, wherein:
the geographic positioning data associated with the first moving object further includes numerical values measuring time-dependent properties of the first moving object at the first and second times, the time-dependent properties to be visualized in the interactive three-dimensional environment; and
the dynamically rendering further comprises dynamically rendering on the display a graphical representation of the time-dependent properties of the first moving object so as to visualize any changes in the time-dependent properties environment from the perspective of the virtual camera moving along the first path from the first time to the second time in the interactive three-dimensional environment.

7. The method of claim 1, wherein the rendered views include a spatial view and a temporal view of the geographic information in the interactive three-dimensional environment.

8. The method of claim 7, wherein the period of time is an adjustable time window in the interactive three-dimensional environment, the defining of the first path of the virtual camera includes defining the first path of the virtual camera in the interactive three-dimensional environment based on a change in position of the first moving object during the time window, and the dynamically rendering includes dynamically updating the rendered animation and views of the geographic information in accordance with the time window.

9. The method of claim 8, further comprising:
determining positions of a second moving object to be visualized during the time window in the interactive three-dimensional environment based on geographic positioning data associated with the second moving object;
positioning a graphical representation of the second moving object at a third position in the interactive three-dimensional environment based on the determined positions of the second moving object during the time window;
defining a second path of the virtual camera in the interactive three-dimensional environment based on the determined positions of the second moving object during the time window;
automatically generating in real-time an animation of the graphical representation of the second moving object during the time window in the interactive three-dimensional environment based on the defined second path of the virtual camera so as to visualize a smooth transition of the first and second moving objects during the time window in the interactive three-dimensional environment; and
dynamically rendering on the display the generated animation of the graphical representation of the second moving object with the generated animation of the graphical representation of the first moving object and the views of the geographic information within the interactive three-dimensional environment from the perspective of the virtual camera moving along the second path during the time window.

10. A geographic information system for animated visualization of geo-located objects in an interactive three-dimensional environment, comprising:
one or more processors;
an object positioner configured to determine a first position of a first moving object to be visualized at a first time in the interactive three-dimensional environment based on past geographic positioning data associated with the first moving object over a past period of time, to position a graphical representation of the first moving object at the first time in the interactive three-dimensional environment according to the determined first position, and to determine a second position of the first moving object to be visualized at a second time in the interactive three-dimensional environment based on the geographic positioning data associated with the first moving object;
a path planner configured to define a first path of a virtual camera in the interactive three-dimensional environment based on the determined first and second positions of the first moving object at the respective first and second times, the first moving object to be visualized in the interactive three-dimensional environment from a perspective of the virtual camera, wherein defining the first path further comprises selecting one or more keyframes along the first path, a focus-point of each keyframe being chosen adaptively based on an analysis of the first path, wherein the more keyframes selected will cause improved precision of the virtual camera following the first path;
an object animator configured to automatically generate in real-time an animation of the first graphical representation of the first moving object comprising a three-dimensional model in the interactive three-dimensional environment based on the first path of the virtual camera so as to visualize a smooth transition of the first moving object from the first position at the first time to the second position at the second time in the interactive three-dimensional environment; and
a renderer configured to dynamically render the generated animation and views of geographic information within the interactive three-dimensional environment on a display from the perspective of the virtual camera moving along the first path from the first position to the second position, the interactive three-dimensional environment enabling a user to manually adjust the rendered views of the geographic information in the interactive three-dimensional environment using a user interface control provided in the interactive three-dimensional environment, wherein the user interface control is a time slider control that enables the user to manually adjust the time window in the interactive three-dimensional environment, and wherein the renderer is further configured to dynamically update in real-time the rendered animation and the rendered views of the geographic information on the display based on input received from the user via the provided user interface control, wherein the period of time is an adjustable time window in the interactive three-dimensional environment, and the dynamically updating comprises adjusting the time window in the interactive three-dimensional environment in accordance with the input received from the user via the time slider control and dynamically updating the rendered animation and the temporal view of the geographic information based on the adjusted time window,
wherein the object positioner, the path planner, the object animator, and the renderer are implemented using the one or more processors.

11. The system of claim 10, wherein the renderer is further configured to dynamically render a visual trace in association with the first moving object so as to visually track a movement of the first moving object along the first path in the interactive three-dimensional environment, the visual trace extending along the first path from a point on the first moving object positioned at the second position at the second time to the first position at the first time.

12. The system of claim 10, wherein the path planner is configured to interpolate the first path of the virtual camera in the interactive three-dimensional environment based on the determined first and second positions of the first moving object in the interactive three-dimensional environment.

13. The system of claim 10, wherein the geographic positioning data is encoded using an encoding language, and the encoded geographic positioning data is interpreted to derive the first and second positions of the first moving object at the respective first and second times in the interactive three-dimensional environment.

14. The system of claim 10, wherein the geographic positioning data associated with the first moving object includes geographic location information, time information, and elevation information associated with the first moving object over the period of time.

15. The system of claim 14, wherein the geographic positioning data associated with the first moving object further includes numerical values measuring time-dependent properties of the first moving object at the first and second times, the time-dependent properties to be visualized in the interactive three-dimensional environment, and wherein the renderer is further configured to dynamically render a graphical representation of the time-dependent properties of the first moving object so as to visualize any changes in the time-dependent properties environment from the perspective of the virtual camera moving along the first path from the first time to the second time in the interactive three-dimensional environment.

16. The system of claim 10, wherein the views rendered by the rendering engine include a spatial view and a temporal view of the geographic information in the interactive three-dimensional environment.

17. The system of claim 16, wherein:
the period of time is an adjustable time window in the interactive three-dimensional environment;
the first path of the virtual camera in the interactive three-dimensional environment is defined based on a change in position of the first moving object during the time window;
the object positioner is further configured to determine positions of a second moving object to be visualized during the time window in the interactive three-dimensional environment based on geographic positioning data associated with the second moving object, and to position a graphical representation of the second moving object at a third position in the interactive three-dimensional environment based on the determined positions of the second moving object during the time window;
the path planner is further configured to define a second path in the interactive three-dimensional environment based on the determined positions of the second moving object during the time window; and
the renderer is further configured to:
automatically generate in real-time an animation of the graphical representation of the second moving object during the time window in the interactive three-dimensional environment based on the defined second path of the virtual camera so as to visualize a smooth transition of the first and second moving objects during the time window in the interactive three-dimensional environment; and
dynamically render on the display the generated animation of the graphical representation of the second moving object with the generated animation of the graphical representation of the first moving object and the views of the geographic information within the interactive three-dimensional environment from the perspective of the virtual camera moving along the second path during the time window.

18. A computer-implemented method for animated visualization of geo-located objects in a geographic information system, comprising:
positioning a graphical representation of a moving object comprising a three-dimensional model in an interactive three-dimensional environment over a past period of time based on past geographic positioning data associated with the moving object, the geographic positioning data including a plurality of geographic locations corresponding to the moving object over time, each location in the plurality of locations associated with a timestamp;
generating a cinematic path for a virtual camera in the interactive three-dimensional environment that keeps the moving object in-view while maximizing contextual understanding of the geographic landscape of the interactive three-dimensional environment, and minimizes nausea through constraining the camera motion in specific ways as it traverses the path, wherein generating the cinematic path further comprises selecting one or more keyframes of geographic information along the cinematic path, a focus-point of each keyframe being chosen adaptively based on an analysis of the cinematic path, wherein the more keyframes selected will cause improved precision of the virtual camera following the cinematic path;
enabling a user to manually adjust the rendered views of the geographic information in the interactive three-dimensional environment using a user interface control provided in the interactive three-dimensional environment, wherein the user interface control is a time slider control that enables the user to manually adjust the time window in the interactive three-dimensional environment;
dynamically updating in real-time the rendered animation and the rendered views of the geographic information on the display based on input received from the user via the provided user interface control, wherein the period of time is an adjustable time window in the interactive three-dimensional environment, and the dynamically updating comprises adjusting the time window in the interactive three-dimensional environment in accordance with the input received from the user via the time slider control and dynamically updating the rendered animation and the temporal view of the geographic information based on the adjusted time window;
constraining rotation speed of the virtual camera based on a distance of the camera to the moving object and a speed of the moving object as an input to both the tilt and the range of the camera; and
smoothing the movement of the virtual camera through adaptive key-framing of the track data.

19. The method of claim 18, wherein the graphical representation of the moving object in the interactive three-dimensional environment is one of a graphical icon or a graphical three-dimensional model.

20. The method of claim 18, wherein the geographic positioning data is encoded using an encoding language, and the encoded geographic positioning data is interpreted to derive the position of the moving object over the period of time in the interactive three-dimensional environment.

21. The method of claim 18, wherein the geographic positioning data associated with the moving object includes geographic location information, time information, and elevation information associated with the first moving object over the period of time.

22. The method of claim 18, wherein the period of time is an adjustable time window in the interactive three-dimensional environment.

23. The method of claim 18, wherein the cinematic path may be a multiple of real-time.

24. The method of claim 18, wherein constraining the rotation speed of the virtual camera further comprises:
applying damping to the virtual camera rotation, wherein the damping allows for a maximum rotation speed for one or more keyframes.

25. The method of claim 24, wherein the maximum rotation speed is calculated for each keyframe depending on the range and tilt of the virtual camera.

* * * * *